United States Patent
Gaulard et al.

(10) Patent No.: US 10,440,781 B2
(45) Date of Patent: Oct. 8, 2019

(54) THICK LAYER HEATING ELEMENT AND KITCHEN APPLIANCE COMPRISING SUCH A HEATING ELEMENT

(71) Applicant: ILLINOIS TOOL WORKS INC., Glenview, IL (US)

(72) Inventors: Hervé Gaulard, Courtefontaine (FR); Yves Lubrina, Chaussenans (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/914,361

(22) PCT Filed: Aug. 22, 2014

(86) PCT No.: PCT/US2014/052380
§ 371 (c)(1),
(2) Date: Feb. 25, 2016

(87) PCT Pub. No.: WO2015/053867
PCT Pub. Date: Apr. 16, 2015

(65) Prior Publication Data
US 2016/0219651 A1    Jul. 28, 2016

(30) Foreign Application Priority Data

Oct. 11, 2013 (FR) .................... 13 59902

(51) Int. Cl.
| | |
|---|---|
| H05B 3/68 | (2006.01) |
| A47J 27/00 | (2006.01) |
| H05B 1/02 | (2006.01) |
| H05B 3/00 | (2006.01) |
| H05B 3/72 | (2006.01) |
| H05B 3/74 | (2006.01) |

(52) U.S. Cl.
CPC .............. *H05B 3/68* (2013.01); *A47J 27/004* (2013.01); *H05B 1/0266* (2013.01);
(Continued)

(58) Field of Classification Search
CPC ........ H05B 3/68; H05B 1/0266; H05B 3/026; H05B 3/72; H05B 3/748; H05B 2203/002; H05B 2203/013; A47J 27/004
(Continued)

(56) References Cited

U.S. PATENT DOCUMENTS

| | | | |
|---|---|---|---|
| 1,838,680 A | 12/1931 | Hudson | |
| 3,895,216 A * | 7/1975 | Hurko | H05B 3/72 219/435 |

(Continued)

FOREIGN PATENT DOCUMENTS

| | | | |
|---|---|---|---|
| EP | 0 635 993 | 1/1995 | |
| EP | 0635993 A2 * | 1/1995 | ........... C04B 35/117 |

(Continued)

OTHER PUBLICATIONS

PCT, International Search Report and Written Opinion of the International Searching Authority, International Application No. PCT/US2014/052380; dated Oct. 2, 2014, 10 pages.

*Primary Examiner* — Dana Ross
*Assistant Examiner* — Joseph M Baillargeon
(74) *Attorney, Agent, or Firm* — Thompson Hine LLP

(57) ABSTRACT

A thick layer heating element (10), in particular for heating a kitchen appliance (100), comprising a planar substrate (24) coated on one of its faces (28) with at least one electrically resistive track (26) which is linked to at least one area of electrical contact, characterized in that it comprises at least one thermal expansion slot (38), said at least one slot (38) defining deformable portions of the heating element, which each comprise a part of the resistive track (26) and which are distributed around said at least one area of electrical contact.

17 Claims, 4 Drawing Sheets

(52) U.S. Cl.
CPC ............. *H05B 3/0014* (2013.01); *H05B 3/72* (2013.01); *H05B 3/748* (2013.01); *H05B 2203/002* (2013.01); *H05B 2203/013* (2013.01)

(58) Field of Classification Search
USPC .................. 219/443.1, 543, 450.1; 257/633; 374/100, 155; 439/913
See application file for complete search history.

(56) References Cited

U.S. PATENT DOCUMENTS

| | | | | |
|---|---|---|---|---|
| 4,048,438 | A | * | 9/1977 | Zimmerman ....... H01L 21/4839 174/254 |
| 4,999,049 | A | * | 3/1991 | Balderson ................ H05B 3/26 219/553 |
| 5,793,929 | A | | 8/1998 | Taylor |
| 6,034,876 | A | * | 3/2000 | Ohno ....................... H01R 9/18 361/736 |
| 6,046,438 | A | * | 4/2000 | Slegt ................. A47J 27/21041 219/441 |
| 2006/0065654 | A1 | * | 3/2006 | Ptasienski ................ H05B 3/28 219/543 |
| 2012/0318785 | A1 | * | 12/2012 | Kushihashi ............ H05B 3/143 219/548 |

FOREIGN PATENT DOCUMENTS

| | | |
|---|---|---|
| EP | 1 189 274 | 3/2002 |
| FR | 2938416 | 5/2010 |
| WO | WO 2009/012239 | 1/2009 |

\* cited by examiner

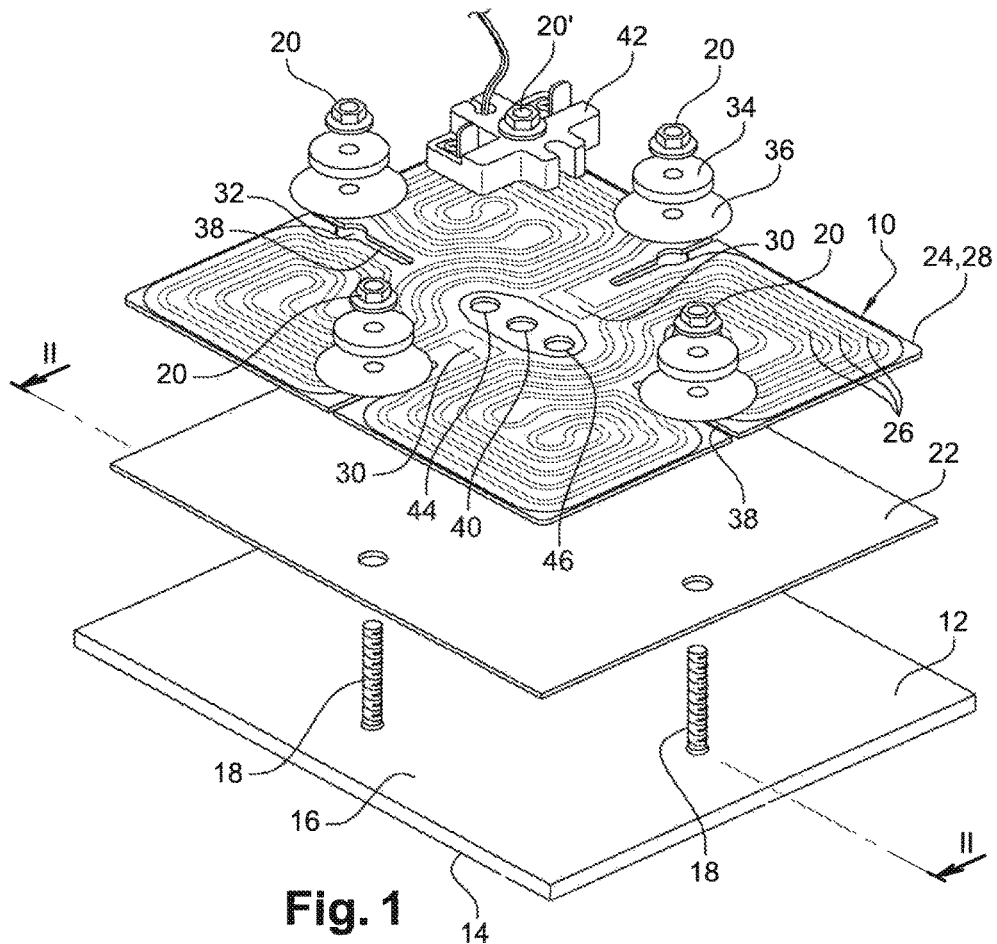
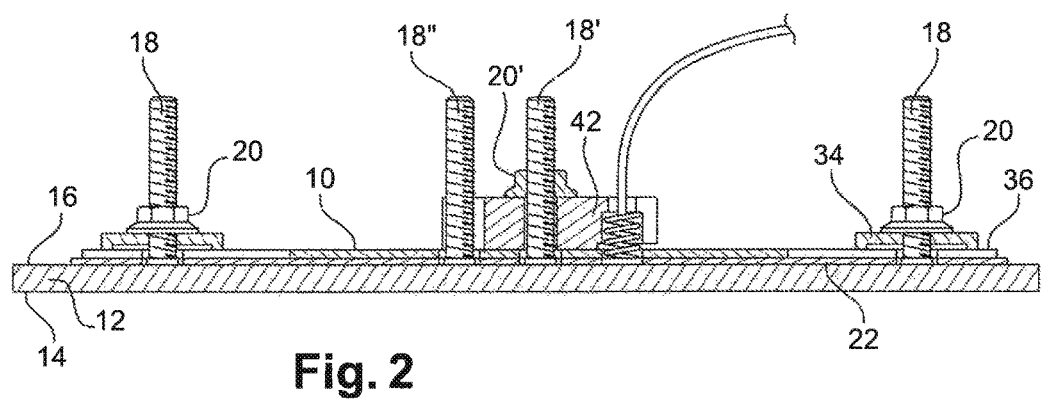

THICK LAYER HEATING ELEMENT AND KITCHEN APPLIANCE COMPRISING SUCH A HEATING ELEMENT

TECHNICAL FIELD

The present invention relates to a thick layer heating element and a kitchen appliance comprising such a heating element.

STATE OF THE ART

The range of products for professional horizontal cooking is made up of various appliances each making it possible to produce different culinary preparations. These appliances are generally intended to be in what has come to be called an oven but can also be installed and used independently.

The following appliances can be cited as forming an integral part of this range: fryer, grill, heating plate, griddle plate, warming plate, salamander, frying pan, braising pan, stock pot, double boiler, and pasta cooker. These appliances are for the most part available with electric or gas heating means.

The diversity of shapes, sizes, temperatures of use of the different products, and the nature of the different products to be heated, have led to the use of different heating means as claimed in the types of appliance.

The electric deep fryers generally comprise a heating assembly consisting of shielded resistors submerged in a tank filled with oil and therefore intended to be in direct contact with the oil. In order to facilitate the cleaning, the heating assembly is generally hinged so as to be able to pivot the resistors out of the tank or so as to have them pivot vertically in the tank in order to free up the space situated under the resistor. This type of construction presents the advantage of transferring almost all of the heating power to the oil to be heated. However, the cleaning is not easy, the resistors are filled with oil during operation, and the volume of oil is greater than necessary because it also has to envelop the resistor. Each tank format requires a suitable form of resistor.

The electric griddles generally comprise a heating assembly made up of shielded resistors fixed under the cooking wall. The cooking wall is generally fairly thick (10 to 12 mm) and can be made of steel, cast iron or of a multilayer material. This type of construction also presents a number of drawbacks:
  the plate has to be thick and made of a material that is sufficiently conductive in order to ensure a good uniformity of the temperature of the cooking wall. This results in a great inertia as much when the temperature is rising as when the temperature is falling, and
  the transfer of temperature between the resistor and the cooking wall is generally not very good, resulting in a low efficiency. Another consequence of this poor efficiency is that the air around the resistors is heated up which means there is a need for good insulation to retain correct performance levels.

The electric frying pans generally comprise a heating assembly consisting of shielded resistors fixed under the bottom of the trough of the frying pan. The cooking wall is generally fairly thick (6 to 12 mm) and can be made of stainless steel or of a multilayer material. This type of construction presents the same drawbacks as the electric griddles.

Different types of brazing pans using different electric heating means are also known.

The patent application FR 2 938 416 describes a cooking appliance, such as a casserole, comprising a cooking wall made of multilayer material and a thick layer heating element pressed onto the cooking wall by means of a pressure plate, a sheet of mica being interposed between the heating element and the pressure plate. This type of construction is not entirely satisfactory notably because the sheet of mica is sensitive to moisture and can have a limited life. Moreover, during use, because of the differential thermal expansions, the cooking wall and the heating element become distorted and can separate from one another. Although the pressure plate is configured to hold the heating element against the cooking wall, gaps can appear between the heating element and the cooking wall, which reduces the efficiency and therefore the heating effectiveness. Furthermore, these gaps result in a poor dissipation of the heat generated by the heating element which can then overheat and have a short life.

Moreover, it has been found that, in operation, a heating element of the current state of the art can have areas that exhibit temperature differences, which means that the cooking wall associated with this heating element cannot be heated uniformly.

The invention proposes a simple, effective, economical solution to at least some of the problems described above.

EXPLANATION OF THE INVENTION

The invention proposes a heating element, in particular for heating a kitchen appliance, comprising a planar substrate coated on one of its faces with at least one electrically resistive layer commonly called "thick" layer in the technical field concerned, this layer being linked to at least one electrical contact area.

The use of thick layer heating is advantageous for rapid and effective heating. In this application, thick layer heating element is understood to be a heating element comprising a substrate upon which is deposited, generally by screen printing, a resistive layer forming a relatively thick heating layer. A dielectric layer is generally inserted between the substrate and the resistive layer, particularly when the substrate is metallic. A conductive layer can be deposited, generally locally, on the resistive layer, in areas of electrical contact and connection, and a protective insulating layer generally covers at least the resistive layer. When the electric current passes into the resistive layer, the latter heats up and releases heat. The heating element therefore works with electrical energy and is suitable for transforming this electrical energy into calorific energy. The resistive layer is differentiated from a conventional resistor notably by the fact that it is deposited on a substrate.

The substrate can have characteristics enabling it both to have a thermal expansion coefficient close to the material or materials used to produce the layers in order to ensure their adhesion and accompany their expansion during the heating and the cooling, but also to distribute and transmit the energy produced by the resistive track, in order for the heat resulting from this energy to be able to be transmitted to the cooking wall.

The substrate is preferably impermeable in order to safeguard the resistive track from the moisture that can be created during the heating and upon the formation of condensation due for example to the presence of frozen foods on the cooking wall.

Since the presence of moisture on the resistive track is known as an important point of nonquality in the production of heating elements, in particular because of more or less porous material, the substrate chosen to produce this heating element is preferably made of a metallic material and preferably a stainless steel, this material having the qualities required and described above.

As claimed in the invention, the substrate is planar and, for example, takes the form of a plate.

At least one of the faces of this substrate is covered with a resistive layer which here forms a track, that is to say a strip of elongate shape, which is generally longer than it is wide. The length of the track is, for example, equal to at least 100 times its width.

The aim of the invention is notably to propose an electric heating system suitable for being associated with different appliances described above and with all the appliances that can be used in a professional kitchen without limitation.

This system makes it possible to solve various drawbacks present on the heating systems that are already known or described above.

In particular, the proposed system presents a solution that makes it possible to retain an optimum transmission of energy between the heating element and the cooking wall throughout the cooking phases.

The system also allows for an accurate regulation of the temperature of the cooking wall, and a very low inertia in the rise and fall in temperature of the cooking wall.

This system can also be available with different powers for the same footprint and for the same fixing mode allowing for maximum adaptability.

The fixing materials and techniques developed can make it possible to guarantee the operation in conditions specific to professional kitchens.

The invention is noteworthy in that the heating element also comprises at least one heat expansion slot, said at least one slot defining deformable portions of the heating element, which each include a part of the resistive track and which are distributed around said at least one electrical contact area.

The presence of at least one thermal expansion slot makes it possible to resolve the abovementioned problem associated with the differential thermal expansions of the heating element and of the cooking wall bearing this element, during use. Through its use, the cooking wall can exhibit significant temperature differences and therefore significant differential expansions. The expansion slot(s) make it possible for the heating element to expand under the effect of the heat while limiting its stresses, and to follow the deformations of the cooking wall.

As claimed in the invention, the thermal expansion slot or slots define deformable portions of the heating element, which each include a part of the resistive track and which are distributed (preferably evenly) around the electrical contact area or areas. The distribution of the deformable portions of the heating element around the electrical contact area is particularly advantageous because it results in a better distribution of the heat in operation.

Advantageously, the fixing element comprises a central fixing point around which the deformable portions or heating areas are evenly distributed. This central point serves as a fixed point from which the heating element can expand in the expansion phases, thus uniformly distributing the dimensional variations.

In a particular embodiment of the invention, the heating element takes the form of a disk, said at least one slot having a radial orientation so that said deformable portions form segments of the disk. These portions or segments extend around the area of electrical contact, which is situated substantially at the center of the disk. This central area is thus the positioning reference for the heating element. It is from this area that each segment expands radially outward. The expansion is therefore distributed equally relative to a central area or point. This construction presents the advantage of distributing the expansions around a central point of the heating element, which can be useful when a number of heating elements are to be assembled side by side or if a circular area is to be heated and the heating is to be kept centered.

The heating element as claimed in the invention can comprise at least one first orifice for the passage of a heating element fixing means. Advantageously, the or each heat expansion slot communicates with the or at least one first orifice.

The inventors have in fact noted that this particular arrangement of the expansion slot or slots makes it possible to ensure a continuous and uniform contact of the heating element on the cooking wall onto which this heating element is intended to be pressed. This particular arrangement consists of a communication of the or each slot with an orifice for the passage of a fixing means of the heating element, for example with the abovementioned cooking wall. In effect, in use, certain parts of the heating element, such as the corners formed by the slots, can have a tendency to distort more than the rest of the heating element and to separate from the cooking wall if they are too far away from the fixing points. By providing the fixing points of the heating element in its expansion slots, it becomes possible to resolve this problem because the abovementioned corners can then be well held in place and pressed against the cooking wall by the fixing means. The proposed solution also makes it possible to optimize the surface of the substrate that can be covered by the resistive track because the first orifices and the slots are assembled together in relatively small areas which may not be covered by the resistive track.

In the present application, "communication between an orifice and a slot" should be understood to mean the fact that the slot emerges in the orifice or vice versa. In other words, the orifice defines a surface or a volume which comprises a part in common with the surface or the volume defined by the slot (and vice versa).

The or each thermal expansion slot can, for example, pass through the or at least a first orifice. In the present application, the fact that a slot passes through an orifice should be understood to mean the fact that this orifice is situated at a distance from the longitudinal ends of the slot. This is a particular case of the abovementioned communication.

The or each thermal expansion slot can have an elongate form, that is to say a length greater than its width. It can be rectilinear. It can extend from one lateral edge of the substrate and be, for example, substantially at right angles to this edge. Each (first) orifice can have a circular form and preferably has a diameter greater than the width of the slot which communicates with this orifice. For example, it has a diameter greater than 2 times, and preferably greater than 3 times, the width of the corresponding slot.

In a particular embodiment of the invention, the heating element has a substantially parallelogram form. In this particular case, the heating element can comprise four expansion slots which each extend from a side of the heating element, and which each pass through a first orifice. The slots can be situated substantially in the middle of the sides of the heating element, respectively. They can have a length representing approximately 10 to 50%, and preferably 20 to 30%, of the dimension of the substrate, measured in a direction substantially parallel to the slot.

As claimed in the invention, the slots define between them deformable portions of the heating element, at least two of them, which each comprise a part of the resistive track. In the abovementioned particular case the slots can define four portions which are deformable substantially independently of one another. The limiting of the number of slots can make it possible to limit the number of deformable portions and the number of fixing elements. The slot or slots also make it possible to take up the dimensional variations due to the expansion of the substrate of the heating element. The freedom afforded by the slots in the expansion allows each portion of the heating element to independently retain a flatness enabling it to remain in contact with the cooking wall. Each portion comprises a part of the resistive track and therefore participates in the heating. Each deformable portion is preferably held in contact with the cooking wall or the thermal interface by at least one fixing means. Each deformable portion is thus fixed to the cooking wall independently, which enables each portion to move independently and follow the deformations or movements imposed by the cooking wall.

The deformable portions of the heating element preferably have substantially the same dimensions. As a variant or as an additional characteristic the resistive track parts of these portions have substantially the same dimensions, and in particular the same length. This makes it possible to guarantee an optimum distribution of the heating. In fact, this guarantees that the deformable portions exhibit substantially the same behavior in operation because they are substantially identical to one another.

The heating element as claimed in the invention comprises at least one resistive track. It can comprise two, three, four or even more of them. Advantageously, the or at least one of the resistive tracks snakes around the or each orifice and around the or each orifice, that is to say that it surrounds or circumvents them at a short distance. The track or tracks can occupy a large part of the abovementioned face of the substrate.

Preferably, the heating element and its resistive track exhibit at least one plane of symmetry at right angles to the plane of the heating element, and preferably two planes of symmetry at right angles to one another and to the plane of the heating element.

The resistive track or tracks can be linked to bump contacts or electrical contact areas which are in the vicinity of one another and are configured to cooperate with contacts of a single electrical connector. The heating element can comprise two bump contacts or areas of contact intended to be connected respectively to two contacts of the electrical connector.

This electrical connector is preferably formed from a block of material, for example ceramic, on which the electrical contacts are fixed.

The heating element can comprise at least one second orifice for the passage of a fixing means for an electrical connector, and, possibly, at least one third orifice for mounting a heat sensor intended to be borne by said electrical connector. Advantageously, the fixing of the connector ensures that the sensor is held bearing on the heating element or the cooking wall.

Each heating element can have its own temperature sensor. It is thus possible, for certain applications, to regulate each heating element to a different temperature. Although these applications lead to variable expansions, the invention makes it possible to ensure that each heating element follows the deformations of the cooking wall.

In the present application, a second orifice which is used for the passage of a fixing means of an electrical connector (and possibly also of the heating element) is differentiated from a first orifice which can be used only to mount a fixing means of the heating element. For its part, a third orifice is used for the passage or mounting of a heat sensor. The heating element can comprise one, two, even more, of each of these first, second and third orifices.

The second and third orifices are preferably situated in proximity to one another and substantially in the middle of the heating element. The electrical connector can thus be mounted substantially in the middle of the heating element and thus have a central position relative to the latter.

The present invention relates also to a heating module comprising a heating element as described in the above, and an electrical connector of the type as described above. The invention thus allows, through its modular design, for a very wide adaptability to different shapes and formats of cooking walls, as well as the possibility of very easily producing a regulation by area.

This arrangement enables each heating module to form an independent assembly comprising a heating element, and an electrical connector possibly equipped with a temperature sensor. This module is suitable for operating independently and can be installed in a modular manner in different appliances.

The present invention also relates to a kitchen appliance, such as a fryer, a grill, a heating plate, a griddle plate, a warming plate, a salamander, a frying pan, a braising pan, a stock pot, a double boiler, or a pasta cooker, characterized in that it includes a cooking wall equipped with at least one heating element as described above. The cooking appliance can comprise a number of heating elements arranged alongside one another.

The invention makes it possible to ensure correct operation and optimum efficiency of the heating element by guaranteeing a heat transfer of quality regardless of the modes of use of the kitchen appliance and the duration of its use.

The uncoated face of the substrate of the heating element can be in direct or indirect contact with the cooking wall. In the latter case, a thermal interface, for example made of graphite or of aluminum, is inserted between the heating element and the cooking wall. It will then be understood that the resistive track is situated on the side opposite the cooking wall and that it is the substrate of the heating element which ensures the transmission of heat to the cooking wall, possibly via the interface.

Through their nature and their generally economical embodiment, the surfaces in contact with the heating element and the cooking wall can have irregularities which do not allow effective and optimum transfer of the heat. The thermal interface is inserted between the heating element and the cooking wall and exhibits a good heat transfer coefficient and a plasticity enabling it to fill the interstices between the two elements and enabling it to effectively transfer the heat between the heating element and the cooking wall. This plasticity enables the interface to follow the deformations of the cooking wall in use. The thermal interface can have substantially the same shape as one or each heating element thus accurately delimiting a heating area. As a variant, in the case where the cooking wall is equipped with a number of heating elements, the thermal interface has a shape similar to that of all of the cooking wall enhancing the uniformity of temperature thereof if necessary.

The thickness of the heating element can be defined in such a way that the heating element is more flexible and more easily deformable than the cooking wall. The substrate therefore preferably has a thickness less than that of the cooking wall, and, for example, between 1 and 2.5 mm approximately.

In a particular embodiment of the invention, the cooking wall is securely attached to at least one first fixing means, such as a stud, which passes through the or at least one first orifice of the heating element. This first means therefore makes it possible to fix the heating element to the cooking wall.

A stud can here be a mechanical member in the form of a rod, partly threaded, making it possible to make a mechanical link between a part equipped with the stud and one or more others passed through by the stud and locked by a nut. In the present case, the stud can be securely attached to the cooking wall by one of its ends, its opposite end receiving a nut for tightening the heating element onto the cooking wall.

The cooking wall can be securely attached to at least one second fixing means, such as a stud, which passes through a second orifice of the heating element and an orifice of an electrical connector. This second means therefore makes it possible to fix both the heating element and the electrical connector to the cooking wall. In this case, the stud can be securely attached to the cooking wall by one of its ends, its opposite end receiving a tightening nut bearing on the connector and clamping it onto the heating element, which is in turn clamped onto the cooking wall.

The electrical connector can comprise at least one indent for receiving a heat sensor which, in the mounted position, can be in contact with or in the immediate vicinity of the heating element or can pass through a third orifice of the heating element and be in contact with or in the immediate vicinity of the cooking wall.

The present invention finally relates to the use of a heating element as described in the above for the cooking of food products (water, oil, foods, etc.).

DESCRIPTION OF THE FIGURES

The invention will be better understood and other details, features and advantages of the invention will become apparent on reading the following description, given as a non-limiting example, with reference to the attached drawings in which:

FIG. 1 is a partial schematic view in exploded perspective, of a kitchen appliance as claimed in the invention, FIG. 2 is a cross-sectional view along the line II of FIG. 1.

DETAILED DESCRIPTION

Figure 3:
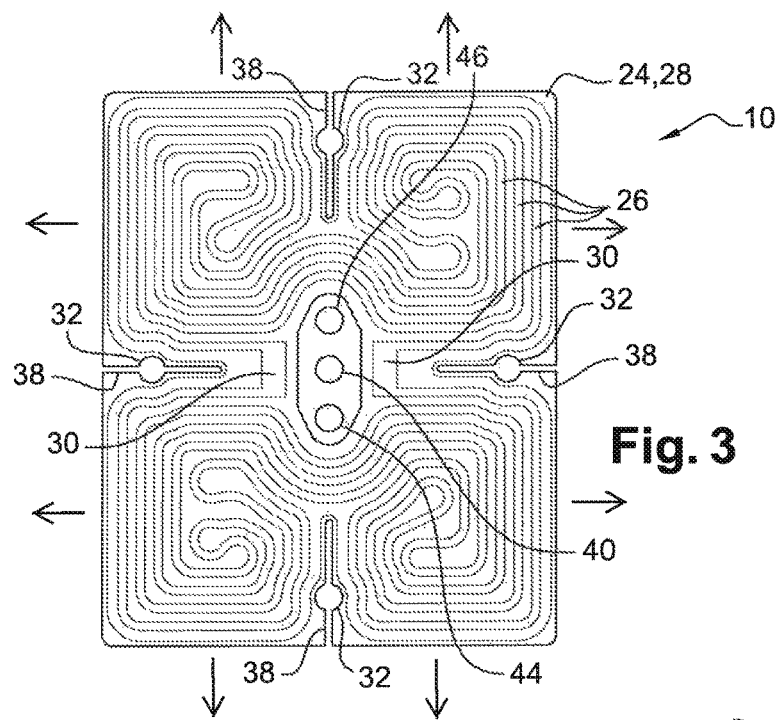
FIG. 3 is a schematic view of a face of the heating element of the kitchen appliance of FIG. 1, FIGS. 4 and 5 are perspective schematic views of an electrical connector as claimed in the invention, seen respectively from above and from below.

FIGS. 1 to 5 represent an exemplary embodiment of a thick layer heating element 10 as claimed in the invention, which is particularly, but not exclusively, suitable for heating a kitchen appliance, only a cooking wall 12 of which is represented in FIGS. 1 and 2.

The kitchen appliance is, for example, a fryer, a griddle, a heating plate, a snacking plate, a heatretaining plate, a slow combustion stove, a frying pan, a braising pan, a cooking pot, a bain marie, a pasta boiler, etc. This appliance comprises one or more cooling walls 12, that is to say one or more walls intended to be in contact with a food product to be heated or cooked or with a vessel (such as a casserole) containing a food product to be heated or to be cooked. Each of these cooking walls 12 is equipped with at least one heating element 10. The number and the position of heating elements of a cooking wall 12 depends in particular on the shape and the dimensions of this wall 12 as well as those on the heating elements 10, as will be described in more detail hereinafter with reference to FIG. 6.

The cooking wall 12 here has a parallelepipedal shape and takes the form of a planar plate. It can be made of stainless steel, a material which offers the advantage of being suitable for cooking foods, easy to clean and chemically inert. This material also offers the advantage of having an expansion coefficient that is identical or close to that used in producing the heating element 10 of the example described hereinbelow. As a variant, the cooking wall 12 can be made of steel, of aluminum, of cast iron or of a multilayer material (for example of stainless steel/steel/stainless steel or stainless steel/aluminum/stainless steel type).

The cooking wall 12 comprises a top face 14 intended to be situated on the side of the food product or of the vessel containing this product, and a bottom face 16 on which is mounted at least one heating element 10. For this, the wall 12 comprises fixing means for the heating element 10.

In the example represented, the fixing means are formed by studs 18, 18', 18". These studs 18, 18', 18" are securely attached to the wall 12 by one of their ends, for example by welding these ends onto the bottom face 16 of the wall 12. Each stud 18, 18', 18" comprises a threaded rod that can receive a nut 20, 20'. They extend substantially at right angles to the wall 12.

In the example represented, the wall 12 is securely attached to six studs, 18, 18' (which are not all visible in FIGS. 1 and 2), four lateral studs 18, a central stud 18', and an additional stud 18". The central stud 18' is situated substantially in the middle of the cooking wall 12 and the lateral studs 18 are here situated at the four corners of a rhomboid whose diagonals intersect substantially at the central stud 18', that is to say the center of the wall 12. The intermediate stud 18" is situated in proximity to the central stud 18'. The studs are all parallel 18, 18', 18".

The heating element 10 is here pressed onto the cooking wall 12 via a thermal interface 22 which is here formed by a sheet of graphite or of aluminum. This interface 22 is in the form of a parallelogram whose width and length are slightly greater than those of the heating element 10. The interface 22 comprises orifices for the passage of the abovementioned studs 18, 18', 18".

The heating element 10 essentially comprises two parts, a substrate 24 and a multilayer structure defining at least one resistive track 26 of the thick layer type.

The substrate 24 is generally in the form of a parallelogram. In the example represented, the substrate 24 is formed by a metal plate, preferably of stainless steel.

The bottom face 28 of the substrate 24 is covered with a number of layers: a dielectric first layer, a resistive second layer, a conductive third layer and an insulating and protective fourth layer. The first layer is, for example, formed by a glazed enamel which covers all of the bottom face 28 of the substrate. The second layer is formed by the resistive track or tracks 26, the topography of this track being notably dependent on the application envisaged. As can be seen in FIG. 3, the track 26 is in the form of a snake which is wound in places on itself, the track covering most of the face 28 of the substrate. It is arranged in such a way as to obtain a uniform distribution of the heating over the entire surface of the substrate 24. It is possible to prioritize certain areas of the heating element by reducing, for example, the space between two parts of the track in order to increase the power density in these areas.

The conductive layer is deposited in particular areas of the track 26, where an electrical connection with a current source has to be made. These areas of contact are designated by the reference 30 in FIG. 3. The last layer covers almost all of the face 28 of the substrate, except for the areas of contact 30. This last layer protects the heating element 10 from moisture and from dust in particular. At least some of the layers of the substrate 24 can be deposited by screen printing, by a printing or spraying technique. They can undergo a baking heat treatment in order to obtain their final characteristics. This type of multilayer structure and its manufacturing method are well known to those skilled in the art.

In the example represented, it could be considered that the heating element 10 comprises a single track 26 or else two tracks 26, each area of contact 30 being linked to one end of each of these two tracks.

As can be seen in FIG. 1, the multilayer structure and the resistive track 26 of the heating element 10 are situated on the side opposite the cooling wall 12. In operation, when an electrical current is applied, the resistive track 26 which is heated up is intended to transmit the heat to the substrate 24 which then transmits at least a part of this heat to the cooking wall 12 via the interface 22. The track 26 is thus not in direct contact with the cooking wall 12.

The heating element 10 comprises through orifices, at least some of which are passed through by studs 18, 18', 18" of the cooking wall 12 and are used to fix the heating element onto this wall.

The heating element 10 comprises first orifices 32 for the passage of the lateral fixing studs 18 for the heating element, of which there are four here. These first orifices 32 are, in the mounting position, aligned with the studs 18 and are therefore also situated at the four corners of a rhomboid whose diagonals intersect substantially at the center of the heating element 10.

These studs 18 receive nuts 20 for tightening the heating element 10 onto the cooking wall 12. In the example represented, a pressure washer 34 and a insulating washer 36, for example made of mica, are passed through by each stud 18 and inserted between the nut 20 and the heating element 10, the nut 20 bearing on the pressure washer 34 which bears on the insulating washer 36, which in turn bears on the heating element 10.

As claimed in the invention, these first orifices 32 are passed through by thermal expansion slots 38 (FIG. 3). Each slot 38 extends from one side of the heating element 10, substantially at right angles to this side and in the middle thereof. Each slot 38 has a rectilinear orientation.

Here, there are four of the slots 38. Between them, they define four deformable portions of the heating element 10 which are fixed onto the cooking wall 10 via two lateral studs 18 and the central stud 18'.

Two of the slots 38, situated on two opposite sides of the heating element 10, are situated in a first plane at right angles to this element, and the other two slots 38, situated on the other two opposite sides of the heating element, are situated in a second plane at right angles to the element 10 and to the first plane.

Here, the first orifices 32 are situated in proximity to the middle of the slots 38, respectively, and have a diameter greater than the width of the slots.

The heating element 10 comprises a second orifice 40 for the passage of the central fixing stud 18' of an electrical connector 42 (FIGS. 4 and 5), this stud 18' also being used to fix the heating element 10. This second orifice 40 is, in the mounting position, aligned with the stud 18' and situated substantially at the center of the heating element 10. This stud 18' receives a nut 20' which bears on the connector 42 and holds it clamped against the heating element 10.

The heating element 10 comprises a third orifice 44 and a fourth orifice 46, the second, third and fourth orifices 40, 44, 46 being in the vicinity of one another and aligned relative to one another in one of the abovementioned planes passing through two slots 38 of the heating element. As can be seen in FIG. 3, these orifices 40, 44, 46 are situated in a central part of the heating element 10 which is surrounded by the resistive track 26.

The fourth orifice 46 is used for the passage of the intermediate stud 18" and the third orifice 44 is used to mount a heat sensor 48 borne by the electrical connector 42.

Figures 4, 5:
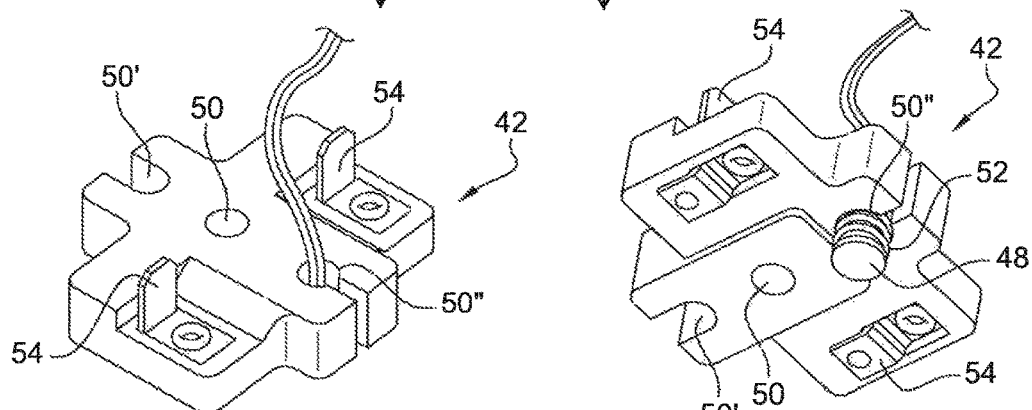

The electrical connector 42, which can be better seen in FIGS. 4 and 5, is formed by a block of ceramic material comprising means 54 for electrically connecting the areas of contact 30 to electrical wires (not represented).

The connector 42 comprises three parallel through orifices 50, 50', 50" which are arranged alongside one another in a same plane, the separation between these orifices being the same as that between the second, third and fourth orifices 40, 44, 46 of the heating element 10 so that, in the mounting position, the orifices 50, 50', 50" are aligned respectively with the orifices 40, 44, 46.

Thus, the central orifice 50 of the connector 42 is aligned with the second orifice 40 of the heating element 10 and is intended to be passed through by the central stud 18', this stud 18' receiving the nut 20' bearing on the connector. One, 50', of the other orifices is aligned with the fourth orifice 46 of the heating element and is intended to be passed through by the intermediate stud 18". This stud 18" does not receive a nut because it is here intended to position the connector 42 and to form abutment means preventing the connector from moving in rotation about the central stud 18'. The last, 50", of the other orifices is aligned with the third orifice 44 and receives the temperature sensor 48 which passes through this orifice 44 and an orifice of the interface 22 and is intended to be stressed bearing against the bottom face 16 of the cooking wall 12 by means of a compression spring 52.

The electrical connection means of the connector 42 here comprise two cabs or metal contacts 54 which are fixed to the block of the connector and which each comprise a first end intended to come into contact with one of the areas of contact 30, when the connector 42 is mounted on the heating element 10, and a second end configured to receive a terminal or a similar means linked to an electrical wire.

The four deformable portions of the heating element 10 are here evenly distributed around the second fixing orifice 40 of the connector 42. They have substantially identical dimensions and shapes. The parts of track 26 that they comprise also have shapes and dimensions that are substantially identical to one another.

The heating element 10 works as follows. The resistive track 26 is supplied with electricity via the connector 42 and generates heat which is transmitted to the substrate 24, this heat then being transferred to the cooking wall 12 via the interface 22, the cooking wall being able to be heated to a temperature of approximately 250-280° C. The sensor 48 makes it possible to monitor the temperature of the cooking wall 12 or of the area of this wall heated by the heating element 10. The electrical power supply from the track 26 is regulated by a control unit notably as claimed in a temperature set point requested by the user and information received from the sensor 48. The expansion slots 38 make it possible to distribute the stresses linked to the thermal expansions of the heating element and make it flexible in order for the element to follow the deformation of the cooking wall. The studs 18, 18' ensure the fixing of the heating element 10 and prevent any separation thereof from the thermal interface 22. They are shrewdly positioned in the slots 38 to optimize the surface area of the substrate 24 covered by the resistive track 26 and to avoid the abovementioned separations.

The second orifice 40 forms a central fixing point from which each deformable portion or heating area extends outward (see arrows). The expansion is therefore equally distributed relative to this central point.

Figure 6:
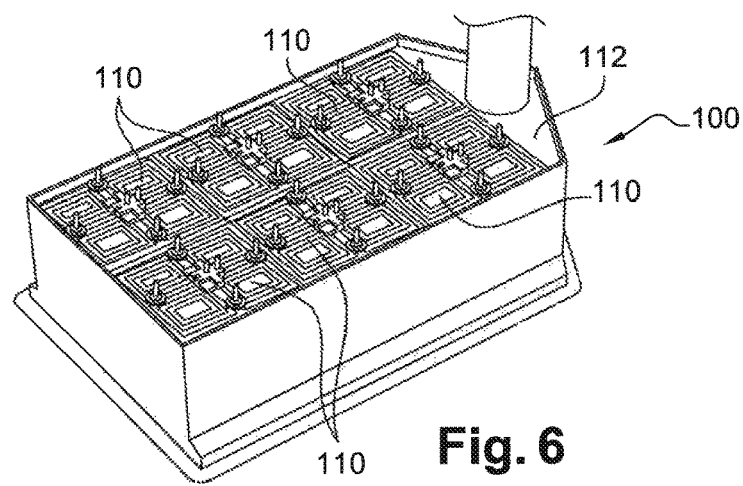
FIG. 6 is a perspective schematic view of a kitchen appliance equipped with a number of heating elements as claimed in the invention, seen from below.

FIG. 6 represents a particular embodiment of a kitchen appliance 100 as claimed in the invention, this appliance 100 here being an oven in which the bottom face of the bottom wall 112 is equipped with a number of heating elements 110 as claimed in the invention, here six of them.

The bottom wall 112 forms a cooking wall which is here planar. The heating elements 110 are coplanar and positioned in two rows of three elements and cover almost all of the wall 112. This wall 112 is here equipped with enough studs to fix all of the heating elements 110. A single interface (not visible), that is to say a single sheet of graphite or of aluminum, can be inserted between the bottom wall 112 and the set of heating elements 110.

Figure 7:
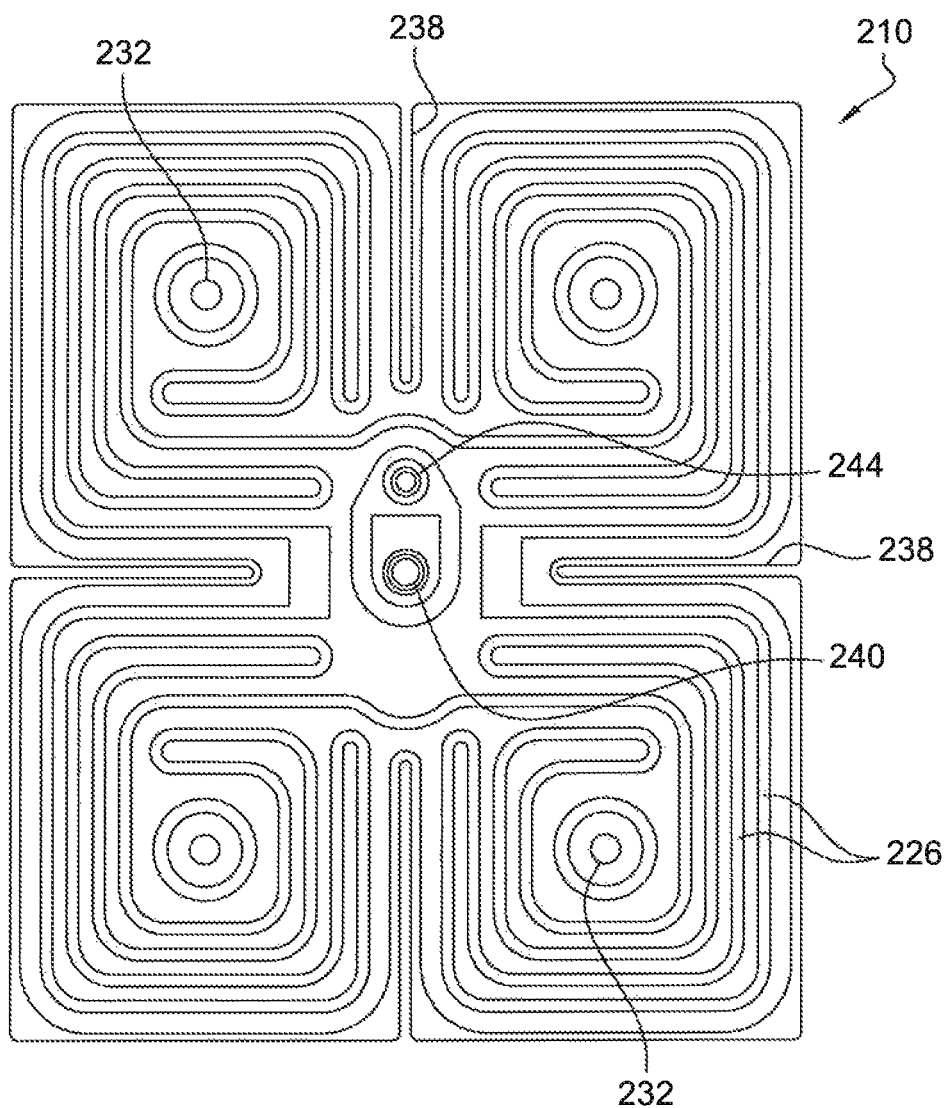
FIGS. 7 and 8 are views similar to that of FIG. 3 and represent variant embodiments of the invention.

FIG. 7 represents a variant embodiment of the heating element 210 as claimed in the invention, which differs from the heating element 10 of FIG. 3, notably in that the first orifices 232 for the passage of the lateral studs are at a distance from the thermal expansion slots 238. The slots 238 are here substantially identical to those of FIG. 3. The first orifices 232 are here situated substantially in the middle of the deformable portions of the heating element delimited by the slots 238. The resistive track or tracks 226 circumvent the slots 238 and the first orifices 232. The heating element 210 here comprises a second orifice 240 for the passage of a fixing stud for an electrical connector and another orifice 244 which can be used for the passage of a stud or to mount a heat sensor.

In this variant, the four deformable portions of the heating element 110 and their parts of track 226 exhibit two planes of symmetry which are at right angles to one another and to the plane of the element, and pass substantially through the slots 238 of the element.

Figure 8:
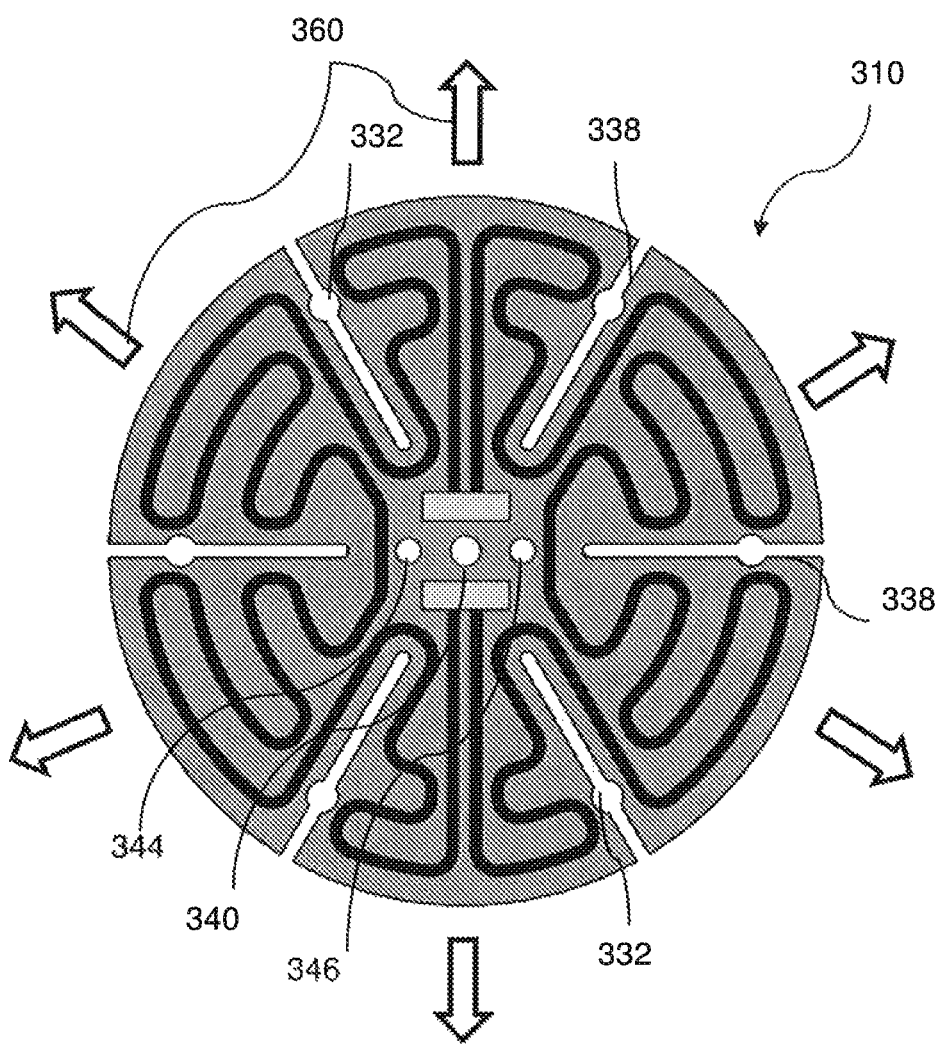

FIG. 8 represents another variant embodiment of the heating element 310 as claimed in the invention, here in the form of a disk, the thermal expansion slots 338 having a substantially radial orientation relative to the center of the disk so that the deformable portions of the heating element are segments of the disc. Here, there are six of the slots 338, evenly distributed about the center of the disk such that the segments are substantially identical. The first orifices 332 for the passage of the lateral studs are in the slots 338 and the other orifices 340, 344, 346 of the abovementioned types are situated at the center of the disk. The segments of the heating element can expand freely in the radial direction (arrows 360).

In this variant, the heating element 310 exhibits two planes of symmetry which are at right angles to one another and to the plane of the element, a first plane which passes through two diametrically opposite slots 338 and through the orifices 340, 344, 346, and a second plane which passes through the middle of two diametrically opposite segments.

The invention claimed is:

1. A thick layer heating element for heating a kitchen appliance, comprising: a planar substrate having a dielectric layer at one face and at least one electrically resistive track upon the dielectric layer and which is linked to at least one electrical contact area, wherein the electrically resistive track is electrically isolated from the substrate, wherein the heating element also comprises multiple heat expansion slots, each said heat expansion slot running from an open slot end at a peripheral edge of the heating element to a closed slot end toward an inner portion of the heating element and each said heat expansion slot extending fully through a thickness of the heating element, including the planar substrate and the dielectric layer, along an area of the heating element that does not include the resistive track or the electrical contact area so as to define and separate deformable portions of the heating element, which each include a part of the resistive track and which are distributed around said at least one electrical contact area, wherein the heating element further comprises a first orifice extending fully through the thickness of the heating element for the passage of a heating element fixing means, and one of the heat expansion slots passes through the first orifice, wherein the first orifice is spaced from both the open slot end and the closed slot end of the heat expansion slot that passes through the first orifice, and the first orifice has a diameter greater than a width of the one heat expansion slot that passes through the first orifice.

2. The heating element as claimed in claim 1, characterized in that the resistive track parts of the deformable portions have substantially the same length.

3. The heating element as claimed in claim 1, characterized in that the heating element has a central fixing point around which said deformable portions are evenly distributed.

4. The heating element as claimed in claim 1, characterized in that the resistive track is linked to electrical contact areas which are in the vicinity of one another and are configured to cooperate with contacts of a single electrical connector.

5. The heating element as claimed in claim 1, characterized in that it comprises at least one second orifice for the passage of a fixing means for an electrical connector and at least one third orifice for mounting a heat sensor intended to be borne by said electrical connector.

6. The heating element as claimed in claim 5, characterized in that the second and third orifices are situated in proximity to one another and substantially in the middle of the heating element.

7. A kitchen appliance configured as a fryer, a grill, a heating plate, a griddle plate, a warming plate, a salamander, a frying pan, a braising pan, a stock pot, a double boiler, or a pasta cooker, characterized in that the kitchen appliance includes a cooking wall equipped with at least one heating element as claimed in claim 1.

8. The kitchen appliance as claimed in claim 7, characterized in that the substrate has a thickness less than that of the cooking wall, and between 1 and 2.5 mm approximately.

9. The kitchen appliance as claimed in claim 7, characterized in that the cooking wall is securely attached to at least one first stud, which passes through the at least one first orifice of the heating element.

10. The kitchen appliance as claimed in claim 9, characterized in that the cooking wall is securely attached to at least one second stud, which passes through a second orifice of the heating element and an orifice of an electrical connector.

11. The kitchen appliance as claimed in claim 10, characterized in that the electrical connector comprises an indent for receiving a heat sensor which, in the mounted position, is in contact with or in the immediate vicinity of the heating element or passes through a third orifice of the heating element and is in contact with or in the immediate vicinity of the cooking wall.

12. The kitchen appliance as claimed in claim 7, characterized in that the kitchen appliance comprises a number of heating elements arranged alongside one another.

13. A heating element for heating a kitchen appliance, comprising: a planar substrate coated at one side face with at least one electrically resistive track that is linked to at least one electrical contact area, wherein the electrically resistive track is electrically isolated from the substrate, wherein the heating element also comprises a plurality of heat expansion slots, each heat expansion slot running from an open slot end at a peripheral edge of the heating element to a closed slot end toward an inner portion of the heating element and each heat expansion slot extending fully through a thickness of the heating element along an area of the heating element that does not include the resistive track to define and separate deformable portions of the heating element, each deformable portion including a part of the resistive track, wherein the deformable portions are distributed around said at least one electrical contact area, wherein the heating element further comprises a first orifice extending fully through the thickness of the heating element for the passage of a heating element fixing means, and one of the heat expansion slots passes through the first orifice, wherein the first orifice is spaced from both the open slot end and the closed slot end of the heat expansion slot that passes through the first orifice, and the first orifice has a diameter greater than a width of the one heat expansion slot that passes through the first orifice;
wherein the resistive track parts of the deformable portions have substantially the same length.

14. The heating element as claimed in claim 13, wherein the heating element has a central fixing point around which said deformable portions are evenly distributed.

15. A kitchen appliance configured as a fryer, a grill, a heating plate, a griddle plate, a warming plate, a salamander, a frying pan, a braising pan, a stock pot, a double boiler, or a pasta cooker, wherein the kitchen appliance includes a cooking wall to which at least one heating element is mounted, wherein the at least one heating element comprises a planar substrate coated at one side face with at least one electrically resistive track that is linked to at least one electrical contact area, wherein the electrically resistive track is electrically isolated from the substrate, wherein the heating element also comprises a plurality of heat expansion slots, each heat expansion slot running from an open slot end at a peripheral edge of the heating element to a closed slot end toward an inner portion of the heating element and each heat expansion slot extending fully through a thickness of the heating element along an area of the heating element that does not include the resistive track to define and separate deformable exterior portions of the heating element, each deformable exterior portion including a part of the resistive track, wherein the deformable exterior portions are distributed around said at least one electrical contact area, wherein the at least one heating element is mounted to one surface of the cooking wall, with the one side face facing away from the one surface, via a plurality of studs that extend from the one surface of the cooking wall, and multiple studs of the plurality of studs align with and pass through orifices located along respective heat expansion slots, wherein each orifice extends fully through the thickness of the heating element and is spaced from both the open slot end and the closed slot end of the heat expansion slot that passes through such orifice, and each orifice has a diameter greater than a width of its respective heat expansion slot.

16. The kitchen appliance of claim 15 wherein a planar thermal interface member is held between the one surface of the cooking wall and the at least one heating element to aid in transferring heat from the at least one heating element to the cooking wall.

17. The kitchen appliance of claim 15 wherein the heating element is able to heat the cooking wall to a temperature in a range of 250-280° C.

* * * * *